(12) United States Patent
Gries et al.

(10) Patent No.: US 9,128,824 B2
(45) Date of Patent: Sep. 8, 2015

(54) IN-PLACE CHANGE BETWEEN TRANSIENT AND PERSISTENT STATE FOR DATA STRUCTURES ON NON-VOLATILE MEMORY

(71) Applicant: Intel Corporation, Santa Clara, CA (US)

(72) Inventors: Matthias Gries, Braunschweig (DE); Marcelo Cintra, Braunschweig (DE); Thomas Lehnig, Braunschweig (DE); Sebastian Steibl, Cremlingen (DE); Tor Lund-Larsen, Braunschweig (DE)

(73) Assignee: Intel Corporation, Santa Clara, CA (US)

( * ) Notice: Subject to any disclaimer, the term of this patent is extended or adjusted under 35 U.S.C. 154(b) by 181 days.

(21) Appl. No.: 13/726,303

(22) Filed: Dec. 24, 2012

(65) Prior Publication Data
US 2014/0181367 A1 Jun. 26, 2014

(51) Int. Cl.
G06F 12/00 (2006.01)
G06F 12/02 (2006.01)
G06F 9/50 (2006.01)

(52) U.S. Cl.
CPC .......... *G06F 12/0246* (2013.01); *G06F 12/023* (2013.01); *G06F 12/0238* (2013.01); *G06F 9/5061* (2013.01); *G06F 9/5077* (2013.01)

(58) Field of Classification Search
CPC ... G06F 9/5061; G06F 9/5077; G06F 12/023; G06F 12/0238; G06F 12/0246
See application file for complete search history.

(56) References Cited

U.S. PATENT DOCUMENTS

| 7,454,673 B2 | 11/2008 | Packer Ali et al. |
| 2005/0066130 A1* | 3/2005 | Rudelic .......................... 711/117 |
| 2009/0150599 A1 | 6/2009 | Bennett |

OTHER PUBLICATIONS

International Search Report and Written Opinion received for International Application No. PCT/US2012/046550, mailed on Sep. 27, 2013.
Narayanan, Dushyanth et al., "Whole-Systems Persistence", Proceedings of the seventeenth international conference on Architectural Support for Programming Languages and Operating Systems, pp. 401-410, Mar. 3-7, 2012, London, England.
Volos, Haris et al., "Mnemosyne: Lightweight Persistent Memory", Proceedings of the sixteenth international conference on Architectural Support for Programming Languages and Operating Systems, Mar. 5-11, 2011, 13 pages, ASPLOS, Newport Beach, CA.
Bailey, Katelin et al., "Operating System Implications of Fast, Cheap, Non-Volatile Memory", Workshop on Hot Topics in Operating Systems, May 2011, 5 pages, Seattle, WA.
"Grasshopper Operating System" retrieved from http://www-systems.cs.st-andrews.ac.uk/gh/ on Jan. 28, 2015.

(Continued)

*Primary Examiner* — Shawn X Gu
(74) *Attorney, Agent, or Firm* — Alpine Technology Law Group LLC

(57) ABSTRACT

Methods and apparatus related to in-place change between transient and persistent state for data structures on non-volatile memory are described. In one embodiment, controller logic causes a change in a state of a first portion of one or more non-volatile memory devices between a persistent state and a transient state and without moving data stored in the first portion of the one or more non-volatile memory devices. Other embodiments are also disclosed and claimed.

30 Claims, 6 Drawing Sheets

(56) References Cited

OTHER PUBLICATIONS

Coburn, Joel et al., "NV-Heaps: making Persistent Objects Fast and Safe with Next-Generation, Non-Volatile Memories", Int. Conference on Architectural Support for Programming Languages and Operating Systems, Mar. 2011, San Diego, CA.

Venkataraman, Shivaram, et al., "Consistent and Durable Data Structures for Non-Volatile Byte-Addressable Memory", USENIX Conference on File and Storage Technologies, Feb. 2011, 15 pages, Urbana, IL.

Java Persistence API, retrieved from http://www.oracle.com/technetwork/java/javaee/tech/persistence-jsp-14 on Jan. 28, 2015.

"Java Persistence API" retrieved from http://en.wikipedia.org/wiki/Java_Persistence_API on Jan. 28, 2015.

Atkinson, M.P. et al., "An Orthogonally Persistent Java", journal, Dec. 1996, p. 68-75, vol. 25, No. 4, SIGMOD Record, New York, NY.

Marquez, Alonso, et al., "Implementing Orthogonally Persistent Java", 2000, p. 218-232, Workshop on Persistent Object Systems.

Richardson, Joel E., et al., "Persistence in the E Language: Issues and Implementation", Journal, Sep. 1988, 58 pages, Computer Sciences Technical Report #791, Madison, WI.

"IBM System/38" retrieved from http://en.wikipedia.org/wiki/IBM_System/38 on Jan. 28, 2015.

"IBM System i", retrieved from http://en.wikipedia.org/wiki/IBM_system_i on Jan. 28, 2015.

"Multics", retrieved from http://en.wikipedia.org/wiki/Multics on Jan. 28, 2015.

"Multics", retrieved from http://www.multicians.org/ on Jan. 28, 2015.

Hardy, Norman, "KeyKOS Architecture", paper, Oct. 1985, p. 8-25, SIGOPS Oper. Syst. Rev., 19. New York, NY.

"Protected and Persistent RAM Filesystem" retrieved from http://pramfs.sourceforge.net/home.html on Dec. 11, 2012.

Condit, Jeremy, et al., "Better I/O Through Byte-Addressable, Persistent Memory", symposium, Oct. 11-14, 2009, 14 pages, SOSP'09, Big Sky, Montana.

Wu, Xiaojian, et al., "SCMFS: A File System for Storage Class Memory", Conference, Nov. 12-18, 2011, 11 pages, SC11, Seattle, WA.

\* cited by examiner

IN-PLACE CHANGE BETWEEN TRANSIENT AND PERSISTENT STATE FOR DATA STRUCTURES ON NON-VOLATILE MEMORY

FIELD

The present disclosure generally relates to the field of electronics. More particularly, some embodiments of the invention generally relate in-place change between transient and persistent state for data structures in non-volatile memory.

BACKGROUND

Generally, memory used to store data in a computing system can be volatile (to store volatile information) or non-volatile (to store persistent information). Volatile data structures stored in volatile memory are used for temporary and intermediate information that is required to support the functionality of a program during the run-time of the program. On the other hand, persistent data structures stored in non-volatile memory are available beyond the run-time of a program and can be reused. Moreover, new data is typically generated as volatile data first, before the user or programmer decides to make the data persistent. For example, programmers or users may cause mapping (i.e., instantiating) of volatile structures in volatile main memory that is directly accessible by a processor. Persistent data structures, on the other hand, are instantiated on non-volatile storage devices like rotating disks attached to Input/Output (I/O or IO) buses or non-volatile memory based devices like flash memory. Persistent information is therefore not directly accessible by a processor and needs to be copied from non-volatile storage to main memory in order to become usable as volatile data by the processor.

One problem with this approach lies in the inefficiency of changing the state of information from volatile to persistent and back. The procedure has to copy the main contents of the data structure from storage (persistent region) to main memory (volatile region) and back. This incurs unnecessary overhead in terms of power consumption, performance, and/or memory footprint. For instance, volatile memory regions may be mapped to main memory (e.g., DRAM (Dynamic Random Access Memory)) and persistent memory regions may be mapped to non-volatile storage devices (such as flash or rotating disk drives). The approach works the same way and has the same inefficiency with having to copy between volatile and non-volatile persistent regions even if the same memory technology was used for both (e.g., by mapping a RAM (Random Access Memory) storage onto main memory).

Furthermore, rotating or hard disk drives provide a relatively low-cost storage solution and are used in many computing devices to provide non-volatile storage. Disk drives, however, can use a lot of power when compared to flash memory since a disk drive needs to spin its disks at a relatively high speed and move disk heads relative to the spinning disks to read/write data. All this physical movement generates heat and increases power consumption. To this end, some higher end mobile devices are migrating towards non-volatile devices without moving parts, such as flash memory and solid state drives. However, flash memory has a number of drawbacks too including, for example, relatively large voltage level requirement to change bit states, delay in write times due to requirement of a charge pump ramp up, having to erase a block of cells at a time, etc.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figure indicates similar or identical items.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware, or some combination thereof.

Some embodiments provide for in-place change between transient and persistent state for data structures on Non-Volatile Memory (NVM) devices. As discussed herein, "in-place change" refers to changing the state of data stored in NVM between transient and persistent states by changing meta data (corresponding to the data structures) and without having to move (or copy) the data structures or data itself. The NVM devices may include flash memory, Phase Change Memory (PCM), Spin Torque Transfer Random Access Memory (STTRAM), Resistive Random Access Memory, 3D (3-Dimensional) Cross Point Memory, etc. Since these NVM devices provide persistence by definition, some embodiments allow for a Unified Memory and Storage (UMS) architecture. With UMS, the fixed partition between main memory (for volatile data structures) and non-volatile storage (for persistent data structures) is no longer required. Instead, changing the state of a data structure from volatile to persistent (and back) in a UMS architecture happens in-place without having to copy the data structure itself in an embodiment.

Hence, some embodiments make the memory and storage subsystems more power efficient during active periods and reduce the stress on the subsystem. As a result, mobile platforms will see an immediate benefit in terms of longer active time on battery. Some embodiments can combine new programming abstractions on OS (Operating System) and software application levels. More and more vertically integrated systems like smart phones and tablets are thus an amenable target for such techniques since these systems may better leverage innovations along the whole system stack.

Figure 1:
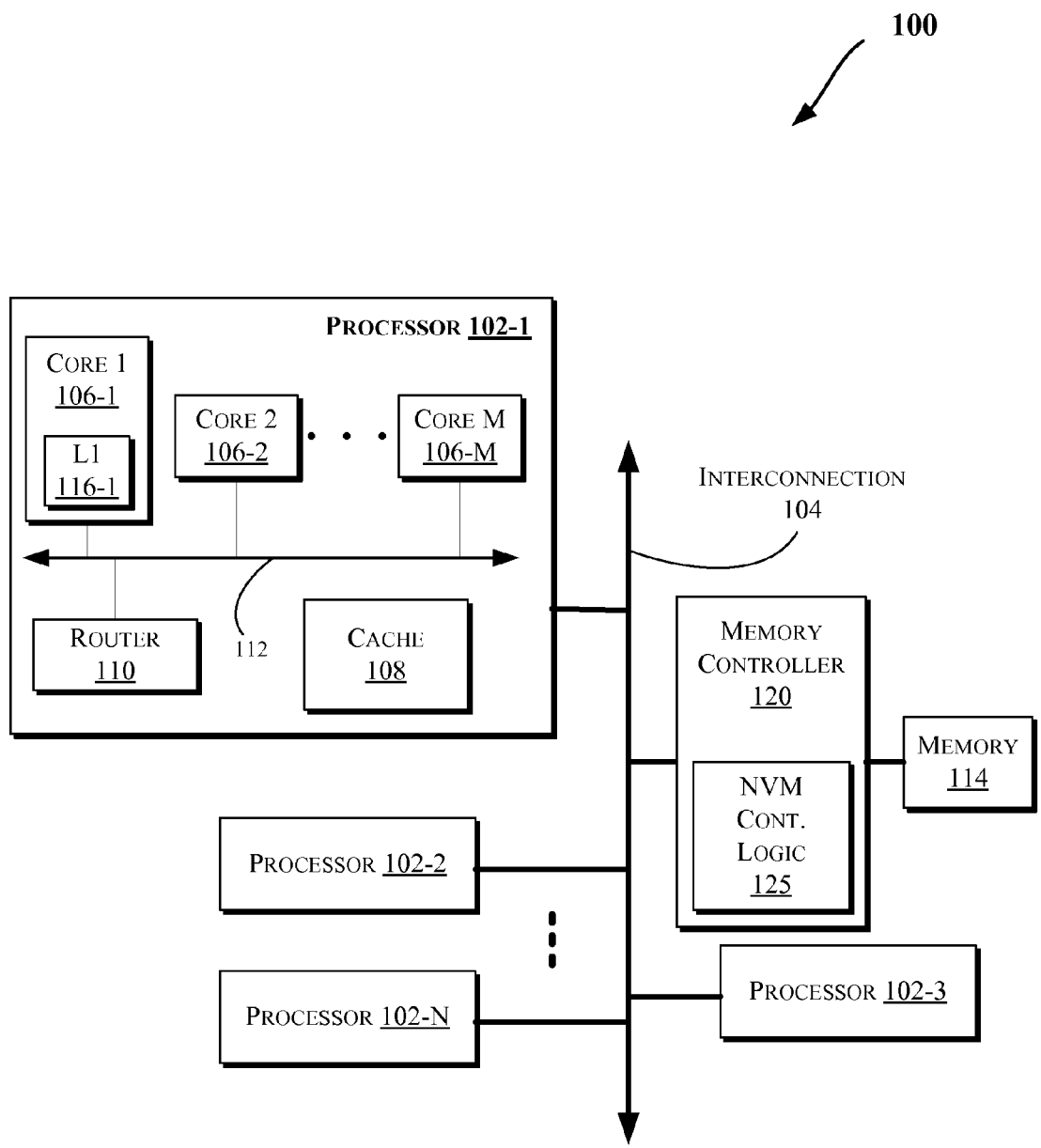
FIGS. 1, 5, and 6 illustrate block diagrams of embodiments of computing systems, which may be utilized to implement various embodiments discussed herein.

Moreover, the memory techniques discussed herein may be provided in various computing systems (e.g., including smart phones, tablets, portable game consoles, Ultra-Mobile Personal Computers (UMPCs), etc.), such as those discussed with reference to FIGS. 1-6. More particularly, FIG. 1 illustrates a block diagram of a computing system 100, according to an embodiment of the invention. The system 100 may include one or more processors 102-1 through 102-N (generally referred to herein as "processors 102" or "processor 102"). The processors 102 may communicate via an interconnection or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106," or more generally as "core 106"), a cache 108 (which may be a shared cache or a private cache in various embodiments), and/or a router 110. The processor cores 106 may be implemented on a single integrated circuit (IC) chip. Moreover, the chip may include one or more shared and/or private caches (such as cache 108), buses or interconnections (such as a bus or interconnection 112), logic 120, memory controllers (such as those discussed with reference to FIGS. 5-6), or other components.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that are utilized by one or more components of the processor 102-1, such as the cores 106. For example, the cache 108 may locally cache data stored in a memory 114 for faster access by the components of the processor 102. As shown in FIG. 1, the memory 114 may be in communication with the processors 102 via the interconnection 104. In an embodiment, the cache 108 (that may be shared) may have various levels, for example, the cache 108 may be a mid-level cache and/or a last-level cache (LLC). Also, each of the cores 106 may include a level 1 (L1) cache (116-1) (generally referred to herein as "L1 cache 116"). Various components of the processor 102-1 may communicate with the cache 108 directly, through a bus (e.g., the bus 112), and/or a memory controller or hub.

As shown in FIG. 1, memory 114 may be coupled to other components of system 100 through a memory controller 120. Memory 114 may include non-volatile memory such as flash memory, PCM, STTRAM, Resistive Random Access Memory, 3D Cross Point Memory, etc. in some embodiments. Even though the memory controller 120 is shown to be coupled between the interconnection 104 and the memory 114, the memory controller 120 may be located elsewhere in system 100. For example, memory controller 120 or portions of it may be provided within one of the processors 102 in some embodiments. Also, in some embodiments, system 100 may include logic (e.g., NVM controller logic 125) to control access to one or more NVM devices (e.g., illustrated as memory 114 in FIG. 1, where the one or more NVM devices may be provided on the same integrated circuit die in some embodiments) and/or cause change in the state of data/structures stored in memory 114 (between persistent and transient states), as discussed herein with respect to various embodiments.

Figure 2:
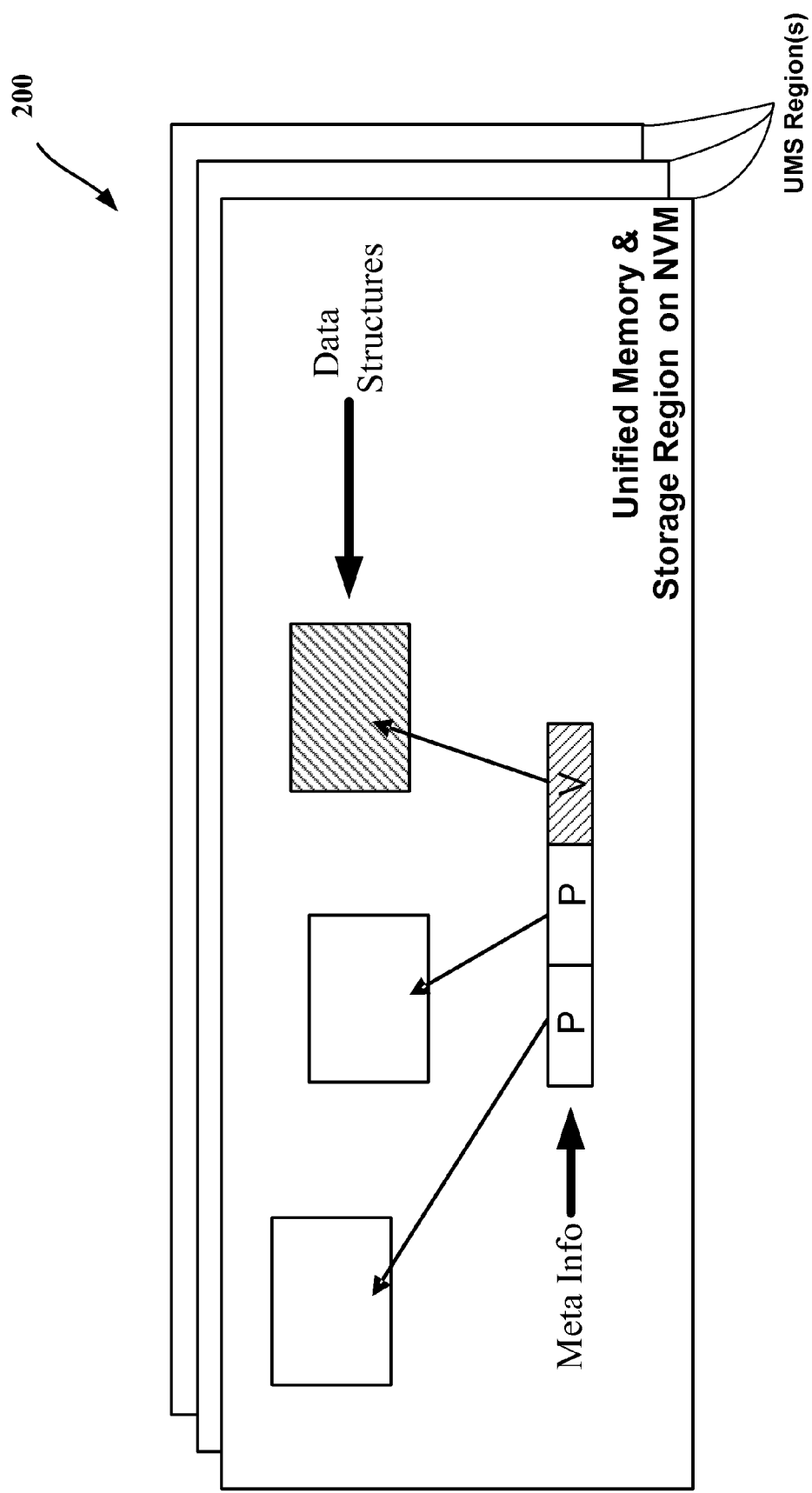
FIGS. 2-3 illustrate unified memory and storage regions in accordance with some embodiments.
Figure 3:
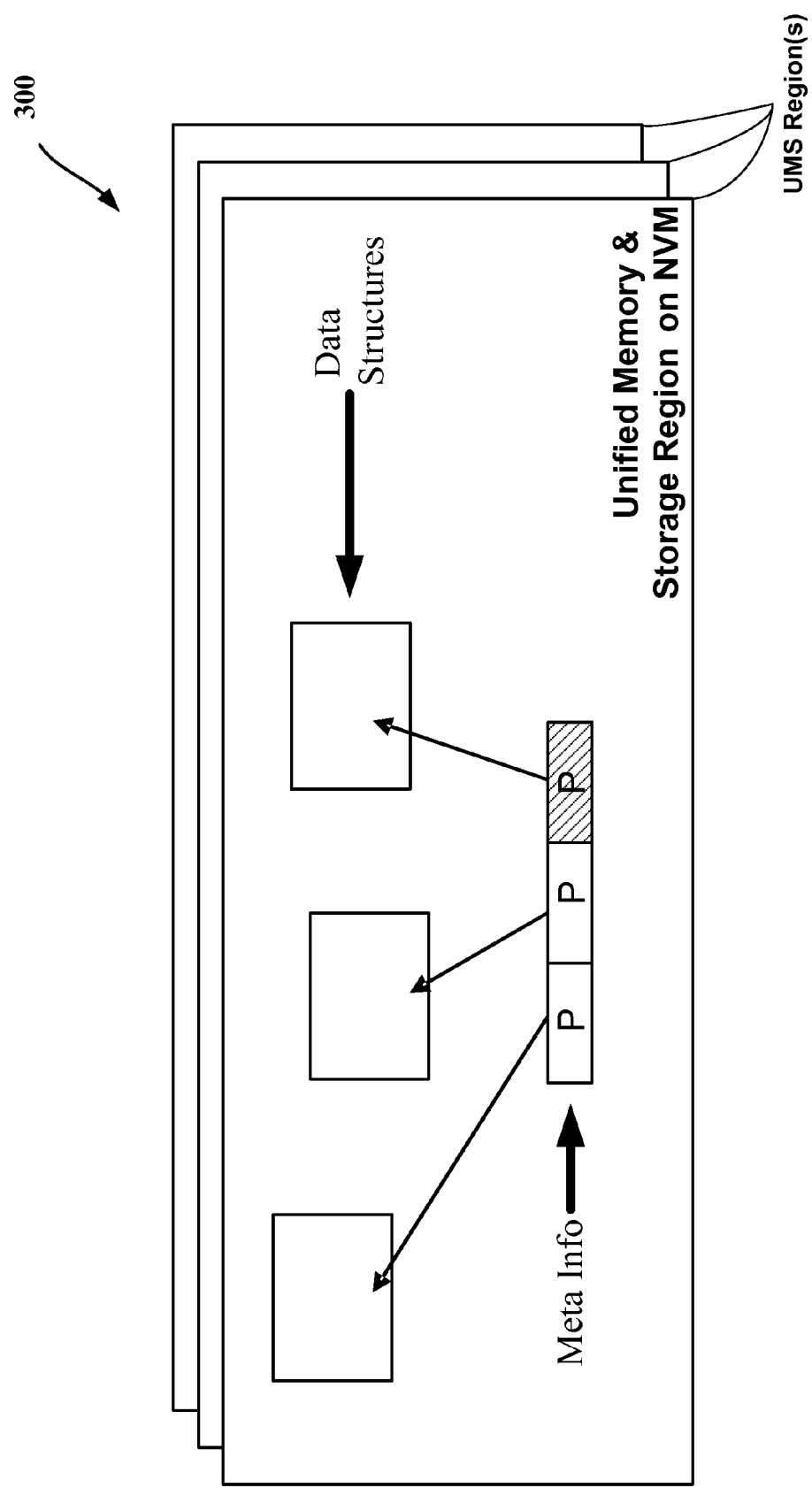

FIGS. 2-3 illustrate a block diagram of unified memory and storage regions to allow for in-place change of state for data structures between volatile and persistent states, according to some embodiments. In an embodiment, the state (volatile vs. persistent) is annotated in a data structure provided in a storage area or unit allocated for such meta information. Any type of storage may be used to store the data/structure state meta information (such as those discussed with reference to FIGS. 5 and/or 6). The meta information for distinguishing between volatile and persistent state can, but need not, be directly bundled with the data structure, i.e., meta information could even be placed on a different memory device as long as the meta data can be associated with the main data structure(s). In an embodiment, the meta information is considered persistent. For simplicity of display only coarse data structures are shown in FIGS. 2-3.

In some embodiments, the data structures include hierarchically organized data. On the other hand, a data structure may be as simple as a defined region or portion in (e.g., UMS) memory (including for example one or more bits of data). The meta information can be very small. The minimum requirement may be a single bit associated with each portion of data (such as a data structure) to distinguish between volatile and persistent state of the data portion. The single bit may be stored in any storage unit such as a register, portion of memory, etc.

Referring to FIG. 2, volatile and persistent data structures on an UMS region are illustrate before state change of the volatile structure on the right (shaded boxes in FIG. 2). In the meta information that is associated with the data structures, "V" stands for volatile state and "P" refers to persistent state. FIG. 3 illustrates volatile and persistent data structures on UMS region after "in-place" state change of the structure on the right (changing from volatile to persistent). As can be seen, only the meta information is changed (shaded box), allowing the data structure itself to stay in-place without having to copy its contents.

Figure 4:
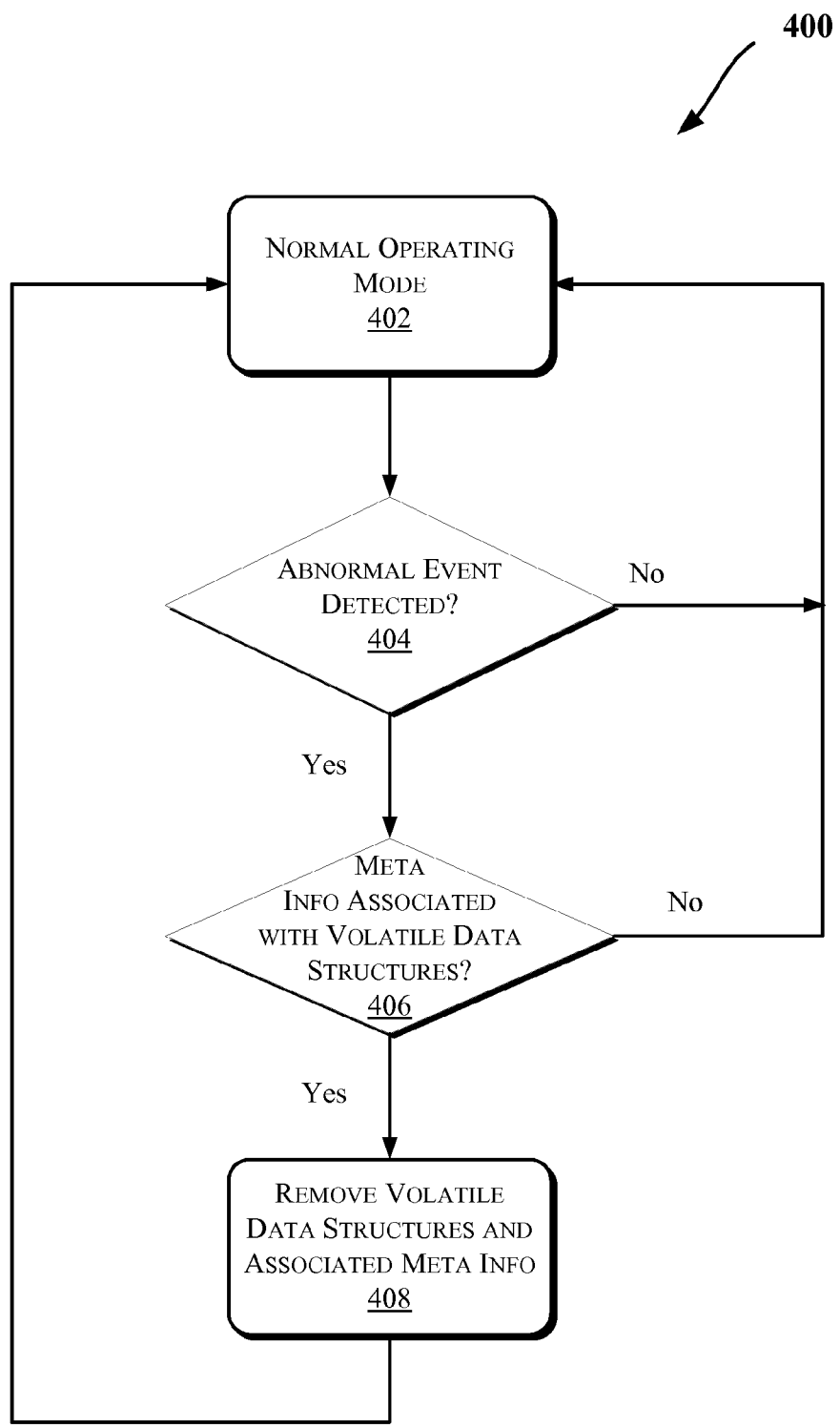
FIG. 4 illustrates a flow diagram of a method to re-initialize system slate, according to an embodiment.

FIG. 4 illustrates a flow diagram of a method 400 to re-initialize system state (e.g., by garbage collection of volatile data structures) according to an embodiment. In various embodiments, one or more operations of method 400 can be performed by one or more components discussed with reference to the other figures (e.g., the logic 125). Furthermore, a similar approach can also be applied in the context of data structures for individual processes/programs in accordance with some embodiments.

Referring to FIG. 4, at an operation 402 a normal operating mode is maintained until an abnormal event is detected at operation 404 (e.g., where the abnormal event generally refers to an abnormal execution state and/or a system crash event). At an operation 406, it is determined whether the meta information contains associations with volatile data structures (e.g., such as illustrated in FIG. 2). If no meta information association is found, then the method 400 resumes with operation 402. Otherwise, at an operation 408, the volatile data structure(s) and associated meta information (determined at operation 406) can be removed from system. After operation 408, method 400 resumes with operation 402.

In some embodiments, applying in-place changes of the volatility state of data structures (e.g., in UMS) allow for the avoidance of the need to copy data structure content between volatile and persistent regions. For example, one or more of the following may be achieved: (1) lower latency access to data structures that have to change their volatility state, such as initializing a volatile object from a persistent object (whereas, traditionally the persistent object would contain redundant information for the volatile object that is created by copying information, and in an embodiment this procedure could happen in place, allowing almost immediate access to the data structure); (2) from a user's perspective, working with data will become more intuitive than using today's open/close file operations (e.g., data can simply be edited in-place and marked as persistent whenever the modifications will be complete); (3) there is no need to artificially partition a memory subsystem into volatile and persistent regions (in part because volatile and persistent data structures can coexist in the same region, further reducing the total capacity required due to a more compact layout); and/or (4) lower resource utilization on a UMS region in terms of throughput and total footprint required for volatile and persistent data structures since redundant copy operations are avoided. The latter feature is visible whenever only one copy (persistent or volatile) is required, for instance, when initializing volatile data from a persistent store and "saving" a volatile data structure considered final to a persistent location. Some embodiments do not prevent using several copies of varying volatility states if required, e.g., as required for maintaining several versions of a data structure.

In some implementations, faulty software and external events like power losses cannot be avoided completely. In traditional systems, volatile information is generally lost after a system crash by definition and system state must be reinitialized by the OS and/or platform. In order to provide the same functionality with some embodiments, the persistent meta information associated with data structures can be used for implementing garbage collection of volatile data structures, as illustrated in FIG. 4 on the system level. The same procedure can be applied for garbage collecting volatile data structures for individual processes and programs that terminated abnormally to avoid stale data that is no longer in use.

An embodiment is subject to hardware/software co-development (e.g., garbage collection can be subject to hardware acceleration, whereas modifications of the meta information can be governed by the OS). For example, disassembling corresponding driver/OS sections can result in recognizing either control sequences to trigger activities in hardware blocks (that can likely be monitored with performance counters or probes on the NVM interface) or maintenance access patterns to the meta information. Also, persistence in system software and applications may be used as options for programming techniques and abstractions in addition to some embodiments discussed herein. Examples are object stores that handle protection against malicious use of data and object-oriented class concepts for using persistent objects.

Figure 5:
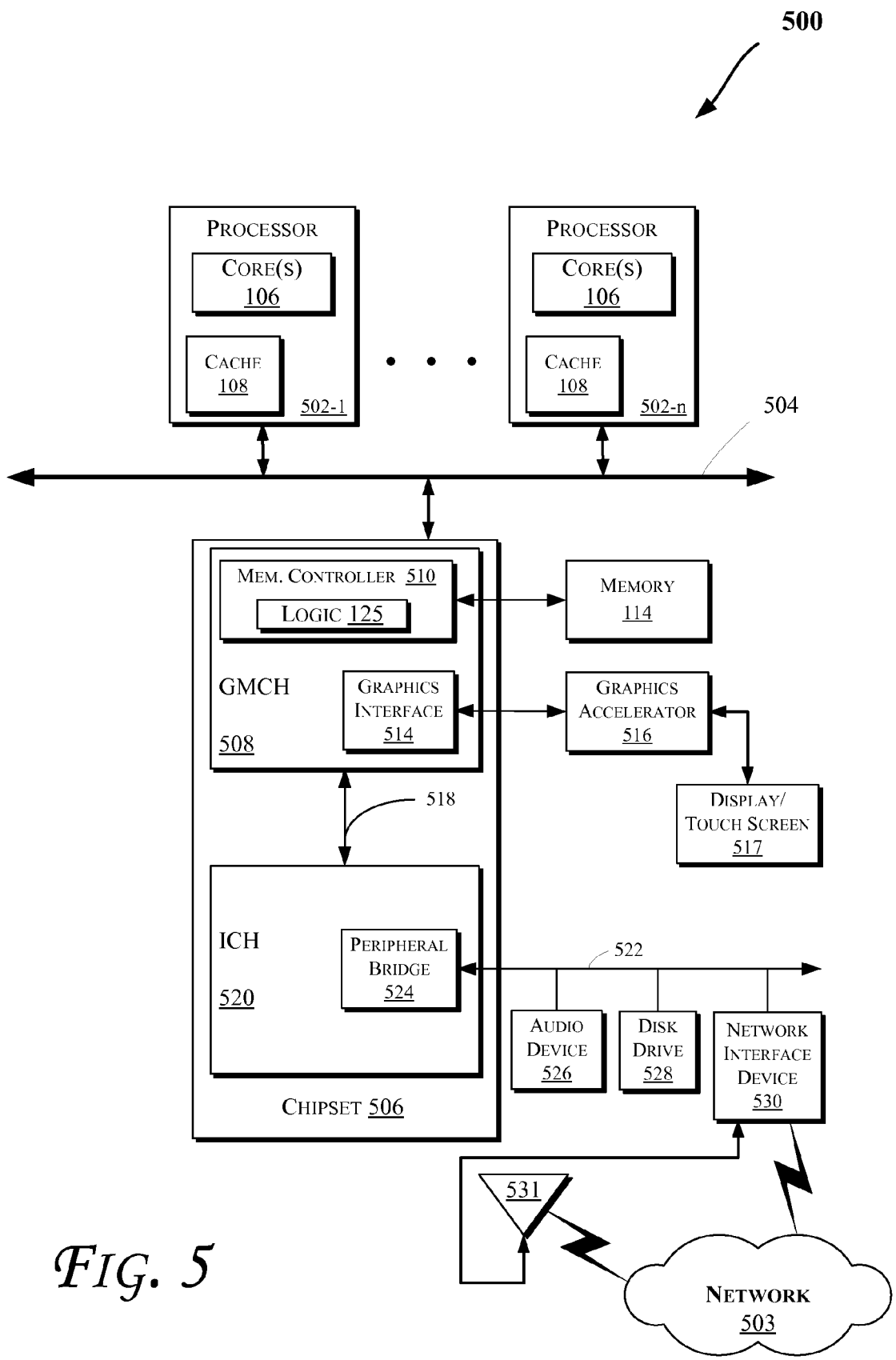

FIG. 5 illustrates a block diagram of a computing system 500 in accordance with an embodiment of the invention. The computing system 500 may include one or more central processing unit(s) (CPUs) 502 or processors that communicate via an interconnection network (or bus) 504. The processors 502 may include a general purpose processor, a network processor (that processes data communicated over a computer network 503), an application processor (such as those used in cell phones, smart phones, etc.), or other types of a processor (including a reduced instruction set computer (RISC) processor or a complex instruction set computer (CISC)). Various types of computer networks 503 may be utilized including wired (e.g., Ethernet, Gigabit, Fiber, etc.) or wireless networks (such as cellular, 3G (Third-Generation Cell-Phone Technology or 3rd Generation Wireless Format (UWCC)), 5G, Low Power Embedded (LPE), etc.). Moreover, the processors 502 may have a single or multiple core design. The processors 502 with a multiple core design may integrate different types of processor cores on the same integrated circuit (IC) die. Also, the processors 502 with a multiple core design may be implemented as symmetrical or asymmetrical multiprocessors.

In an embodiment, one or more of the processors 502 may be the same or similar to the processors 102 of FIG. 1. For example, one or more of the processors 502 may include one or more of the cores 106 and/or cache 108. Also, the operations discussed with reference to FIGS. 1-4 may be performed by one or more components of the system 500.

A chipset 506 may also communicate with the interconnection network 504. The chipset 506 may include a graphics and memory control hub (GMCH) 508. The GMCH 508 may include a memory controller 510 (which may be the same or similar to the memory controller 120 of FIG. 1 in an embodiment, e.g., including the logic 125) that communicates with the memory 114. The memory 114 may store data, including sequences of instructions that are executed by the CPU 502, or any other device included in the computing system 500. In one embodiment of the invention, the memory 114 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk, flash, PCM, 3D Cross Point Memory, Resistive Random Access Memory, and STTRAM. Additional devices may communicate via the interconnection network 504, such as multiple CPUs and/or multiple system memories.

The GMCH 508 may also include a graphics interface 514 that communicates with a graphics accelerator 516. In one embodiment of the invention, the graphics interface 514 may communicate with the graphics accelerator 516 via an accelerated graphics port (AGP). In an embodiment of the invention, a display 517 (such as a flat panel display, touch screen, etc.) may communicate with the graphics interface 514 through, for example, a signal converter that translates a digital representation of an image stored in a storage device such as video memory or system memory into display signals that are interpreted and displayed by the display. The display signals produced by the display device may pass through various control devices before being interpreted by and subsequently displayed on the display 517.

A hub interface 518 may allow the GMCH 508 and an input/output control hub (ICH) 520 to communicate. The ICH 520 may provide an interface to I/O devices that communicate with the computing system 500. The ICH 520 may communicate with a bus 522 through a peripheral bridge (or controller) 524, such as a peripheral component interconnect (PCI) bridge, a universal serial bus (USB) controller, or other types of peripheral bridges or controllers. The bridge 524 may provide a data path between the CPU 502 and peripheral devices. Other types of topologies may be utilized. Also, multiple buses may communicate with the ICH 520, e.g., through multiple bridges or controllers. Moreover, other peripherals in communication with the ICH 520 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 522 may communicate with an audio device 526, one or more disk drive(s) 528, and a network interface device 530 (which is in communication with the computer network 503, e.g., via a wired or wireless interlace). As shown, the network interlace device 530 may be coupled to an antenna 531 to wirelessly (e.g., via an Institute of Electrical and Electronics Engineers (IEEE) 802.11 interface (including IEEE 802.11a/b/g/n, etc.), cellular interface, 3G, 5G, LPE, etc.) communicate with the network 503. Other devices may communicate via the bus 522. Also, various components (such as the network interface device 530) may communicate with the GMCH 508 in some embodiments of the invention. In addition, the processor 502 and the GMCH 508 may be combined to form a single chip. Furthermore, the graphics accelerator 516 may be included within the GMCH 508 in other embodiments of the invention.

Furthermore, the computing system 500 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 528), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 6:
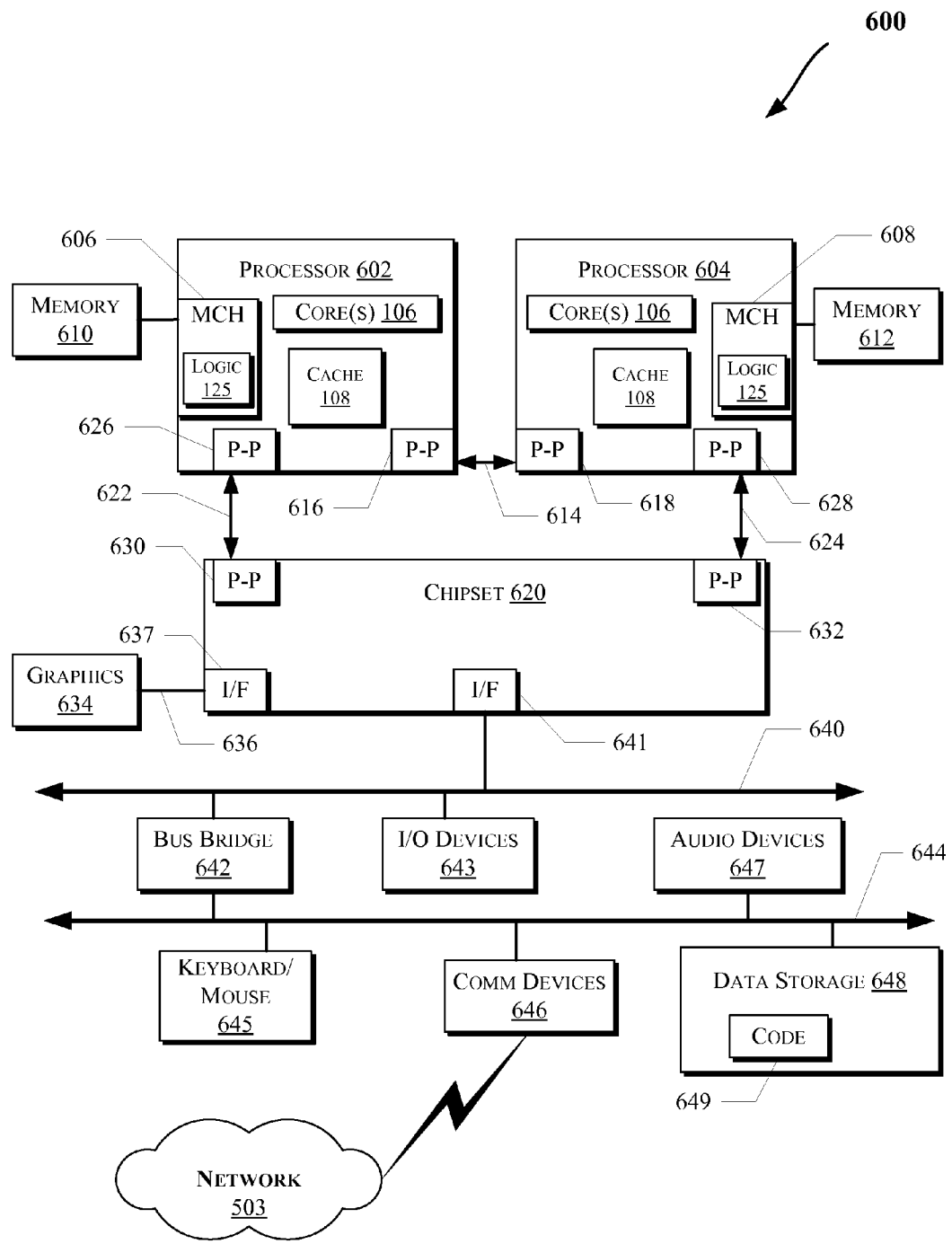

FIG. 6 illustrates a computing system 600 that is arranged in a point-to-point (PtP) configuration, according to an embodiment of the invention. In particular, FIG. 6 shows a system where processors, memory, and input/output devices are interconnected by a number of point-to-point interfaces. The operations discussed with reference to FIGS. 1-5 may be performed by one or more components of the system 600.

As illustrated in FIG. 6, the system 600 may include several processors, of which only two, processors 602 and 604 are shown for clarity. The processors 602 and 604 may each include a local memory controller hub (MCH) 606 and 608 to enable communication with memories 610 and 612. The memories 610 and/or 612 may store various data such as those discussed with reference to the memory 114 of FIGS. 1 and/or 5. Also, MCH 606 and 608 may include the memory controller 120 and/or logic 125 of FIG. 1 in some embodiments.

In an embodiment, the processors 602 and 604 may be one of the processors 502 discussed with reference to FIG. 5. The processors 602 and 604 may exchange data via a point-to-point (PtP) interface 614 using PtP interface circuits 616 and 618, respectively. Also, the processors 602 and 604 may each exchange data with a chipset 620 via individual PtP interlaces 622 and 624 using point-to-point interface circuits 626, 628, 630, and 632. The chipset 620 may further exchange data with a high-performance graphics circuit 634 via a high-performance graphics interface 636, e.g., using a PtP interface circuit 637. As discussed with reference to FIG. 5, the graphics interface 636 may be coupled to a display device (e.g., display 517) in some embodiments.

As shown in FIG. 6, one or more of the cores 106 and/or cache 108 of FIG. 1 may be located within the processors 602 and 604. Other embodiments of the invention, however, may exist in other circuits, logic units, or devices within the system 600 of FIG. 6. Furthermore, other embodiments of the invention may be distributed throughout several circuits, logic units, or devices illustrated in FIG. 6.

The chipset 620 may communicate with a bus 640 using a PtP interface circuit 641. The bus 640 may have one or more devices that communicate with it, such as a bus bridge 642 and I/O devices 643. Via a bus 644, the bus bridge 642 may communicate with other devices such as a keyboard/mouse 645, communication devices 646 (such as modems, network interface devices, or other communication devices that may communicate with the computer network 503, as discussed with reference to network interface device 530 for example, including via antenna 531), audio I/O device, and/or a data storage device 648. The data storage device 648 may store code 649 that may be executed by the processors 602 and/or 604.

In various embodiments of the invention, the operations discussed herein, e.g., with reference to FIGS. 1-6, may be implemented as hardware (e.g., circuitry), software, firmware, microcode, or combinations thereof, which may be provided as a computer program product, e.g., including a tangible (e.g., non-transitory) machine-readable or computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed with respect to FIGS. 1-6.

Additionally, such tangible computer-readable media may be downloaded as a computer program product, wherein the program may be transferred from a remote computer (e.g., a server) to a requesting computer (e.g., a client) by way of data signals (such as in a carrier wave or other propagation medium) via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
   controller logic to control access to one or more non-volatile memory devices;
   a storage unit to store a bit to indicate whether a first portion of the one or more non-volatile memory devices has one of a persistent state and a transient state,
   wherein the controller logic is capable to cause a change in a state of the first portion of the one or more non-volatile memory devices between the persistent state and the transient state without movement of data stored in the first portion of the one or more non-volatile memory devices and without partition of the one or more non-volatile memory devices into volatile and persistent regions.

2. The apparatus of claim 1, wherein the one or more non-volatile memory devices are to comprise one or more of: flash memory, Phase Change Memory (PCM), 3D (3-Dimensional) Cross Point Memory, Resistive Random Access Memory, and Spin Torque Transfer Random Access Memory (STTRAM).

3. The apparatus of claim 1, wherein the first portion is to comprise one or more bits of data.

4. The apparatus of claim 1, wherein the bit is to be stored in the one or more non-volatile memory devices.

5. The apparatus of claim 1, wherein the controller logic is to cause removal of the data stored in the first portion of the one or more non-volatile memory devices and the bit stored in the storage unit in response to detection of an abnormal event and a determination that the bit and the first portion are associated.

6. The apparatus of claim 1, wherein the controller logic is to cause a change to a state of the bit to modify the state of the first portion of the one or more non-volatile memory devices between the persistent state and the transient state and without moving the data stored in the first portion of the one or more non-volatile memory devices.

7. The apparatus of claim 1, wherein the one or more non-volatile memory devices are on a same integrated circuit die.

8. The apparatus of claim 1, wherein one or more of the controller logic, a memory, the one or more non-volatile memory devices, and a processor core are on a same integrated circuit die.

9. The apparatus of claim 1, wherein a memory controller is to comprise the controller logic.

10. The apparatus of claim 1, wherein the storage unit is to comprise a register.

11. A method comprising:
controlling access to one or more non-volatile memory devices via controller logic;
storing a bit in a storage unit to indicate whether a first portion of the one or more non-volatile memory devices has one of a persistent state and a transient state,
wherein the controller logic is capable to cause a change in a state of the first portion of the one or more non-volatile memory devices between the persistent state and the transient state without moving data stored in the first portion of the one or more non-volatile memory devices and without partitioning the one or more non-volatile memory devices into volatile and persistent regions.

12. The method of claim 11, wherein the one or more non-volatile memory devices comprise one or more of: flash memory, Phase Change Memory (PCM), 3D Cross Point Memory, Resistive Random Access Memory, and Spin Torque Transfer Random Access Memory (STTRAM).

13. The method of claim 11, wherein the first portion comprises one or more bits of data.

14. The method of claim 11, further comprising storing the bit in the one or more non-volatile memory devices.

15. The method of claim 11, further comprising causing removal of the data stored in the first portion of the one or more non-volatile memory devices and the bit stored in the storage unit in response to detection of an abnormal event and a determination that the bit and the first portion are associated.

16. The method of claim 11, further comprising causing a change to a state of the bit to modify the state of the first portion of the one or more non-volatile memory devices between the persistent state and the transient state and without moving the data stored in the first portion of the one or more non-volatile memory devices.

17. The method of claim 11, wherein the one or more non-volatile memory devices are on a same integrated circuit die.

18. The method of claim 11, wherein one or more of the controller logic, a memory, the one or more non-volatile memory devices, and a processor core are on a same integrated circuit die.

19. The method of claim 11, further comprising storing the bit in a register.

20. A system comprising:
one or more non-volatile memory devices;
a processor to access data stored on the one or more non-volatile memory devices via a controller logic;
the controller logic to control access to the one or more non-volatile memory devices;
a storage unit to store a bit to indicate whether a first portion of the one or more non-volatile memory devices has one of a persistent state and a transient state,
wherein the controller logic is capable to cause a change in a state of the first portion of the one or more non-volatile memory devices between the persistent state and the transient state without movement data stored in the first portion of the one or more non-volatile memory devices and without partition of the one or more non-volatile memory devices into volatile and persistent regions.

21. The system of claim 20, wherein the one or more non-volatile memory devices are to comprise one or more of: flash memory, Phase Change Memory (PCM), 3D Cross Point Memory, Resistive Random Access Memory, and Spin Torque Transfer Random Access Memory (STTRAM).

22. The system of claim 20, wherein the first portion is to comprise one or more bits of data.

23. The system of claim 20, wherein the bit is to be stored in the one or more non-volatile memory devices.

24. The system of claim 20, wherein the controller logic is to cause removal of the data stored in the first portion of the one or more non-volatile memory devices and the bit stored in the storage unit in response to detection of an abnormal event and a determination that the bit and the first portion are associated.

25. The system of claim 20, wherein the controller logic is to cause a change to a state of the bit to modify the state of the first portion of the one or more non-volatile memory devices between the persistent state and the transient state and without moving the data stored in the first portion of the one or more non-volatile memory devices.

26. The system of claim 20, wherein the one or more non-volatile memory devices are on a same integrated circuit die.

27. The system of claim 20, wherein one or more of the controller logic, a memory, the one or more non-volatile memory devices, and a processor core are on a same integrated circuit die.

28. The system of claim 20, wherein a memory controller is to comprise the controller logic.

29. The system of claim 20, further comprising an audio device.

30. The system of claim 20, wherein the storage unit is to comprise a register.

* * * * *